United States Patent [19]

Nakane et al.

[11] 4,270,360
[45] Jun. 2, 1981

[54] DEVICE FOR STORAGE OF HYDROGEN

[75] Inventors: Masanori Nakane, Takatsuki; Yasuaki Osumi, Minoo; Hiroshi Suzuki, Ikeda; Aakihiko Kato, Matsubara, all of Japan

[73] Assignees: Agency of Industrial Science & Technology; Ministry of International Trade & Industry, both of Tokyo, Japan

[21] Appl. No.: 116,481

[22] Filed: Jan. 29, 1980

[30] Foreign Application Priority Data

Mar. 19, 1979 [JP] Japan .................................. 54/32937

[51] Int. Cl.³ .............................................. F17C 11/00
[52] U.S. Cl. .............................. 62/48; 123/DIG. 12; 165/61; 165/DIG. 17; 206/0.7
[58] Field of Search ................ 62/48; 423/248; 34/15; 123/DIG. 12; 165/61, DIG. 17; 206/0.7

[56] References Cited

U.S. PATENT DOCUMENTS

| 3,516,263 | 6/1970 | Wiswall, Jr. et al. | 62/48 |
| 4,185,979 | 1/1980 | Woolley | 62/48 |
| 4,187,092 | 2/1980 | Woolley | 62/48 |

FOREIGN PATENT DOCUMENTS

| 5090512 | 2/1977 | Japan | 62/48 |
| 2030693 | 10/1980 | United Kingdom | 62/48 |

Primary Examiner—Ronald C. Capossela
Attorney, Agent, or Firm—Kurt Kelman

[57] ABSTRACT

A device for the storage of hydrogen, comprising a container, two porous plates opposed parallelly to each other across a fixed distance and fastened to the inner wall of the container, heating/cooling members disposed one each outside the porous plates and separated by a fixed distance from the corresponding porous plates, and an alloy capable of storing hydrogen placed in the spaces formed between the porous plates and the heating/cooling members.

6 Claims, 5 Drawing Figures

U.S. Patent
Jun. 2, 1981
4,270,360
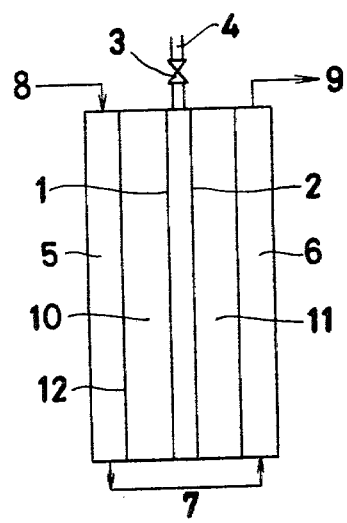
Fig._1
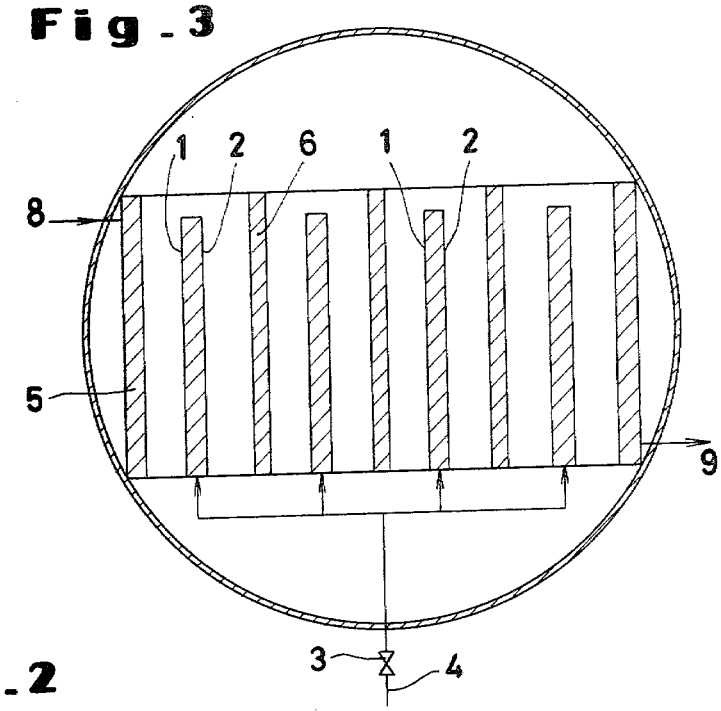
Fig._3
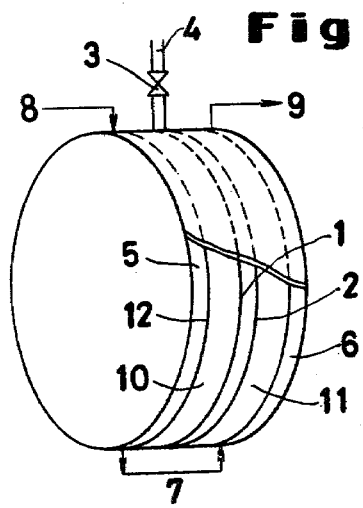
Fig._2
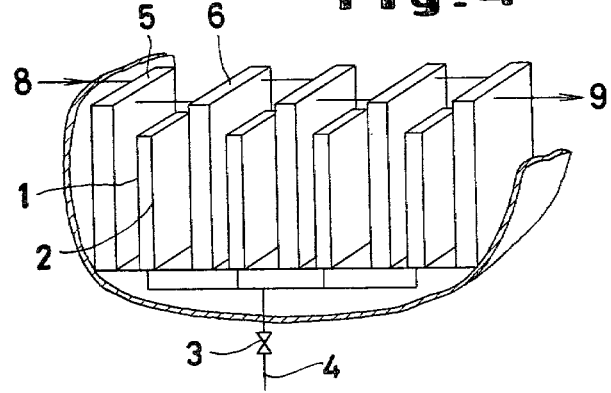
Fig._4
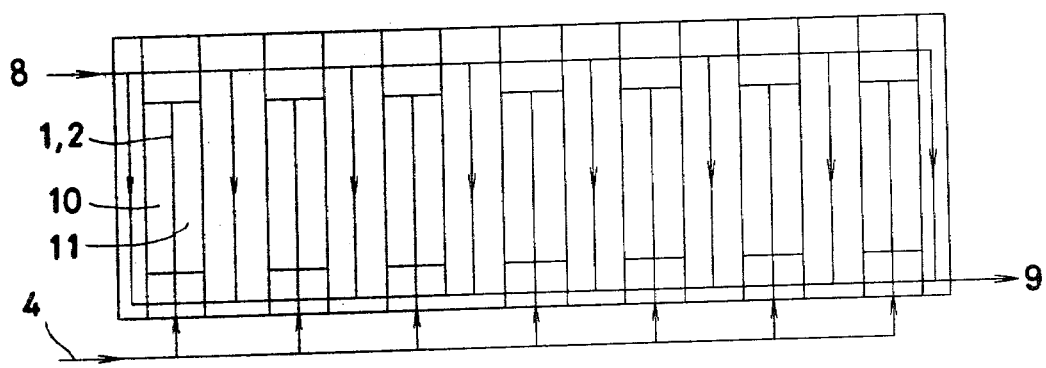
Fig._5

DEVICE FOR STORAGE OF HYDROGEN

BACKGROUND OF THE INVENTION

This invention relates to a device for the storage of hydrogen by use of an alloy capable of storing hydrogen therein.

Hydrogen, as an energy source which promises to take the place of fossil fuels such petroleum and coal which are destined to be exhausted sooner or later, has been attracting increasing attention.

Methods proposed to date for the storage of hydrogen include (A) a method for storing hydrogen in its gaseous form, (B) a method for storing hydrogen in its liquefied form, and (C) a method for storing hydrogen as metal hydride by use of an alloy.

The method (A), because of the necessity for handling hydrogen under a very high pressure exceeding 150 atmospheres, cannot necessarily be called an efficient approach and, to make the matter worse, proves deficient in safety. The method (B) has the disadvantage that the production of liquefied hydrogen requires supply of hydrogen of extremely high purity, installation of expensive manufacturing facilities and provision of storage containers capable of withstanding very low temperatures. Thus, this method has found utility in only limited applications.

The method (C) makes use of the ability of a certain metal or alloy to occlude hydrogen and convert itself into a metal hydride and the ability of this metal hydride to release the hydrogen and convert itself back to its original metal or alloy. It enjoys better practical utility than the methods (A) and (B). Research has been positively pursued in search of alloys which are optimum for the storage of hydrogen by occlusion. On the other hand, almost no consideration has been given to the development of a device for storage of hydrogen by use of such an alloy. The development of such a device has been generally ignored because of a very great difficulty which soon becomes obvious to anyone who begins developmental work. Alloys for storing hydrogen evolve heat during the occlusion of hydrogen and absorb heat during the release of hydrogen. This means that the storage device must be of a structure which allows the evolution and absorption of heat to proceed smoothly. To devise a device of a structure which permits smooth evolution and absorption of heat is a very difficult task.

The inventors therefore continued a diligent study in search of a device with a construction which is free from the aforementioned problem of heat conduction involved during the occlusion and release of hydrogen by the alloy and capable of retaining, in principle, the optimum charge amount of the alloy for the storage of hydrogen. The present invention has resulted from this study.

The object of this invention is to provide a device for the storage of hydrogen by use of an alloy capable of occluding hydrogen, which device eliminates the problem of heat conduction involved during the occlusion and release of hydrogen by the alloy, enjoys high operational efficiency and economy, has high safety, and permits ready scaling up of the equipment for large applications.

SUMMARY OF THE INVENTION

To accomplish the object described above according to the present invention, there is provided a device for the storage of hydrogen, which device comprises a closed container, two porous plates opposed parallelly to each other across a fixed distance and fastened to the interior wall of the closed container so as to divide the interior space of the container, and two heating/cooling members disposed one each outside the porous plates and separated by a fixed distance from the corresponding porous plates, with spaces between the porous plates and the corresponding heating/cooling members filled with such an amount of the hydrogen-storage alloy as to optimize the conduction of the heat being evolved and absorbed by the alloy during the occlusion and release of hydrogen.

In short, the device for the storage of hydrogen according to this invention is characterized by being packed with the hydrogen-storage alloy and further being provided with two heating/cooling members which are disposed one each outside the packed alloy. To be specific, the alloy and the heating/cooling members are adapted relative to each other so that, when the heating/cooling members are heated or cooled for the release or occlusion of hydrogen by the alloy, the transfer of heat or the conduction of heat between the alloy and the heating/cooling members will be retained under a fixed relationship. The aforementioned combination of the component parts of the device forms one basic unit. The device can be scaled up, therefore, by increasing the number of such basic units. This permits the total capacity of the device for the storage of hydrogen to be easily increased without entailing any change to the internal conditions of the device.

BRIEF EXPLANATION OF THE DRAWING

FIG. 1 represents one preferred embodiment of the device for the storage of hydrogen according to the present invention.

FIG. 2 is a partially cutaway perspective view of the device of FIG. 1.

FIG. 3 represents a typical device for the storage of hydrogen according to this invention, which device is formed by having a plurality of basic units of the construction of FIG. 1 parallelly arranged.

FIG. 4 is a partially cutaway perspective view of the device of FIG. 3.

FIG. 5 is another preferred embodiment of the device for the storage of hydrogen according to this invention, having a plurality of basic units of the construction of FIG. 1 parallelly arranged.

DESCRIPTION OF THE PREFERRED EMBODIMENT

The alloy for the storage of hydrogen which is used in the device according to this invention is a binary, ternary or quaternary alloy generally using magnesium, titanium or a rare earth metal as its principal component. Examples of alloys usable for this purpose include $Mg_2Ni$, $TiFe$, $TiCo_{0.5}Fe_{0.5}$, $TiCo_{0.5}Mn_{0.5}$, $LaNi_5$, $MmNi_5$, $MmNi_{4.5}Al_{0.5}$, $MmNi_{4.5}Mn_{0.5}$ and $MmNi_{2.5}Co_{2.5}$.

The alloy occludes hydrogen at the optimum temperature under the optimum hydrogen pressure according to the hydrogen occlusion-release characteristics peculiar to that alloy to form its hydride. This hydride of the alloy undergoes thermal decomposition with release of hydrogen at appropriate temperature and pressure.

Generally, the porous plates are unglazed ceramic plates, sintered metal plates or metal gauzes. Of these plates, sintered metal plates are used preferably. One essential property required for the porous plates is mechanical strength sufficient to withstand the pressure exerted by the hydrogen-storage alloy which is placed in the device. For the sake of the compactness of the device, these porous plates are desired to have the least allowable thickness, which generally falls in the range of from 1 to 5 mm. In the case of sintered metal plates or metal gauzes, the metal used as their material is only required to be inactive to hydrogen. Stainless steel, aluminum, nickel, etc. prove to be most suitable as the material for sintered plates because of their outstanding fabricability.

Now, one embodiment of the device for the storage of hydrogen according to the present invention will be described with reference to the accompanying drawing.

It should be noted that this invention is not limited by the embodiments to be cited hereinafter but may be freely modified within the scope of the technical idea underlying this invention.

FIG. 1 is a schematic sectioned view of one embodiment of the device for the storage of hydrogen according to this invention, and FIG. 2 is a partially cutaway perspective view of the device of FIG. 1. In the accompanying drawing, the device for the storage of hydrogen according to this invention is illustrated as possessing the appearance of a drum or a cylinder of small height. The apparatus is not necessarily limited to this shape. It may have any suitably selected shape. For example, a container of a rectangular or elliptic cross section may be advantageously utilized. It is a closed container because it must fulfill the basic requirement of keeping hydrogen entrapped therein. The container is also required to withstand pressure to some extent.

At the center of the interior of this container, two sintered metal plates 1, 2 are parallelly opposed to each other across a fixed distance and fastened to the inner wall of the container. The term "sintered metal plates" shall be used herein as representing porous plates.

The sintered metal plates 1, 2 and the heating/cooling members 5, 6 are required to be separated from each other so much as to give rise to spaces large enough for holding therein ample supply of hydrogen-storage alloy. The each heating/cooling members disposed one each outside the two sintered metal plates are desired to have an equal capacity for heating and cooling. In due consideration of these requirements, it is desirable for the sintered metal plates to be located about halfway along the entire thickness of the "drum" as illustrated in FIG. 2.

The sintered metal plates have the shape of circular plates in FIG. 2. They are not always limited to this shape. Optionally they may be square plates or rectangular plates, according to the shape of the container being used. The space between the two parallel sintered metal plates serves as the passage for hydrogen which is occluded or released by the alloy. The distance between the two sintered metal plates is to be determined by the velocities of the inflow and outflow of hydrogen during the occlusion and release of hydrogen by the alloy, the total amount of the alloy to be placed in the device and other characteristics of the alloy. Generally, this distance is desired to fall within the range of from 5 to 20 mm, preferably from 8 to 10 mm. The space between the two sintered metal plates connects with a valve 3 adapted to control the supply and discharge of hydrogen. The valve 3 connects to hydrogen feed pipe 4. The hydrogen feed pipe 4 functions as a path for discharging the hydrogen released by the alloy.

Outside the opposed sintered metal plates, the heating/cooling members 5, 6 each embracing an inner space for retaining a heating or cooling medium are disposed at a fixed distance (to be described afterward) from the corresponding sintered metal plates. These members are adapted to communicate with each other via a connection pipe 7. The heating/cooling member 5 is provided with an inlet pipe 8 and the heating/cooling member 6 with an outlet pipe 9. A cooling medium is introduced through the inlet pipe 8 while the hydrogen-storage alloy is occluding hydrogen, and a heating medium is supplied through this pipe while the alloy is releasing hydrogen. For the purpose of heating and cooling, gaseous or liquid media may be used. These media need not be prepared specifically for use in the operation of the device of this invention. As the heating medium, an effluent liquid or exhaust gas of varying temperature (of not more than 100° C.) may be used. As the cooling medium, waste water or plain air of room temperature or a lower temperature may be used. The temperatures of the heating and cooling media which are to be actually used are determined by the characteristics of hydrogen occlusion and release exhibited by the hydrogen-storage alloy. The spaces 10 and 11 which occur between the sintered metal plate 1 and the heating/cooling member 5 and between the sintered metal plate 2 and the heating/cooling member 6 are each filled with the hydrogen-storage alloy which is generally in the form of powder or granules.

Generally, the thermal conductivity which the hydrogen-storage alloy exhibits before occlusion of hydrogen and that the alloy exhibits after occlusion of hydrogen differ widely. Thus, the thickness of the packed hydrogen-storage alloy formed in the spaces 10, 11 governs the efficiency of the device for the storage of hydrogen. The heat conduction increases with the decreasing thickness of the packed alloy. If this thickness is too small, however, the compactness of the device is spoiled.

The thickness of the packed hydrogen-storage alloy is determined by the kind of the particular hydrogen-storage alloy to be used, namely the thermal conductivity of the alloy. When $LaNi_5$ is adopted as the alloy, for example, the thickness of the packed alloy to be placed in the space between the sintered metal plate and the heating/cooling member is desired to be about 2 cm.

To uniformize the conditions for the occlusion and release of hydrogen, namely the conditions of heat conduction, at various portions of the packed hydrogen-storage alloy placed in the space between the sintered metal plate 1 and the surface 12 of the heating/cooling member 5, the sintered metal plate 1 and the surface 12 of the corresponding heating/cooling member 5 are generally desired to be kept parallel to each other. More desirably, the two opposed surfaces should be parallel to each other and identical in shape.

When the device for the storage of hydrogen of this invention illustrated in FIGS. 1-2 is assumed to use $LaNi_5$ as the hydrogen-storage alloy and store 1.6 $Nm^3$ of hydrogen, typical physical particulars for this device may be as follows. Since the hydride of $LaNi_5$ is $LaNi_5H_6$, the weight of $LaNi_5$ required to occlude 1.6 $Nm^3$ of hydrogen is 10.3 kg. Since the specific gravity of $LaNi_5$ is 8.4 and the packing ratio of $LaNi_5$ is 75%, the volume of the space to be filled with $LaNi_5$ is 1.63 liters. When the thickness of the packed bed of $LaNi_5$ is fixed at the optimum value of 2 cm as described above, the bottom area of the drum illustrated in FIG. 2 is 407.5 cm$^2$ and the diameter of this circle is 22.8 cm. Since the packed alloys have a total thickness of 2 cm×2, the porous plates a total thickness of 1 cm, and the heating-/cooling members a total thickness of 1.5 cm×2, therefore, the total thickness of the device (drum) is 8 cm. The device, therefore, has a size of 22.8 cm (diameter)×8 cm (thickness).

Now, the procedure of the operations of occlusion and release of hydrogen by the device of this invention as illustrated in FIGS. 1-2 will be described.

First, the hydrogen-storage alloy placed in the device is activated. A typical method of activation will be described. The alloy is caused to occlude hydrogen under a hydrogen pressure of 7 kg/cm$^2$. Then the hydrogen occluding alloy is caused to release hydrogen at a temperature of 70° C. This treatment serves the purpose of activating the hydrogen-storage alloy.

Then, the cooling medium is passed through the inlet pipe 8 to cool the device and, at the same time, the hydrogen from a cylinder is fed under pressure through the hydrogen feed pipe 4 into the device. The pressure under which the hydrogen is introduced into the device has an effect upon the velocity of the occlusion of hydrogen by the hydrogen-storage alloy. During the introduction of hydrogen to the device, therefore, the pressure is controlled by adjusting the valve 3. Generally, the pressure for the introduction of hydrogen into the device is not less than the pressure of equilibrium dissociation of the hydrogen-storage alloy at arbitrary temperature and not more than the maximum pressure which can be endured by the container of the device.

The hydrogen which has been introduced under pressure into the space between the two sintered metal plates as described above uniformly passes into the whole of the packed hydrogen-storage alloy. The occlusion of hydrogen proceeds uniformly and reaches its completion after a certain period of time.

When the hydrogen stored as described above in the alloy is to be used, the cooling medium is switched to the heating medium to heat the packed hydrogen-storage alloy and cause the metal hydride to release hydrogen. The hydrogen thus released from the metal hydride travels through the sintered metal plates in the direction opposite the direction of travel during the occlusion. At a flow rate which is controlled by the valve 3, the hydrogen is discharged through the hydrogen feed pipe 4.

In the device for the storage of hydrogen according to this invention which is constructed as described above, the optimum thickness of the packed hydrogen-storage alloy which is determined by the hydrogen occlusion-release characteristics of the alloy is retained. Since the condition of the heat conduction to the packed hydrogen-storage alloy during the heating or cooling is retained constant at all the stages of occlusion and release of hydrogen and at all the portions of the alloy, the occlusion and release of hydrogen by the alloy within this device can be continued smoothly.

The device of this invention can be scaled up to a desired capacity by simply serially arranging as many basic units of the aforementioned construction as required on the particular occasion.

In the combination of a multiplicity of basic units, a compact device wherein the heating/cooling members are disposed so that each of the members intervenes between a pair of porous plates and serves for both the two packed hydrogen-storage alloys placed in the two spaces formed one each on the opposite sides of the member between the opposed surfaces of the pair of porous plates can be constructed as follows. Specifically, this compact device is obtained by having at least three heating/cooling members parallelly spaced so as to divide the interior of the pressureproof closed container, having two porous plates parallelly opposed to each other in each of the spaces intervening between the adjacent heating/cooling members and allowing the spaces intervening between the porous plates and the heating/cooling members to be packed with such an amount of the hydrogen-storage alloy as will best suit the heat conduction involved in the occlusion and release of hydrogen by the alloy. In the device formed by the combination of the multiplicity of basic units, the thickness of the packed hydrogen-storage alloy placed in each of the multiplicity of spaces is not changed at all by scaling up the capacity of the device. Thus, the optimum conditions of heat conduction are retained intact. This means that there is absolutely no need of paying any consideration to the possibility of a change in the conditions of heat conduction in the interior of the packed bed of the hydrogen-storage alloy as suffered by the conventional device in consequence of scaling up capacity. The hydrogen-storage device of such a large capacity obtained by the present invention, therefore, enjoys as high operational efficiency, economy and safety as the device of the size of the basic unit.

Now, a few typical scaled up basic units of the device for the storage of hydrogen according to the present invention will be described below.

FIG. 3 is a sectioned view of the device for the storage of hydrogen which is formed by having serially arranged a plurality of basic units of the device of this invention shown in FIG. 1 and covering the combined basic units with an angular container whose corners fall on the inner wall of a cylindrical container. FIG. 4 is a partially cutaway perspective view of the device.

As is plain from FIG. 3, two sintered metal plates 1, 2 and two heating/cooling members 5, 6 which are parallelly arranged form each of the plurality of small compartments, and the spaces intervening between the adjacent sintered metal plates and heating/cooling members are each packed with the hydrogen-storage alloy having a thickness which permits retention of the optimum heat-exchange efficiency.

When LaNi$_5$ is used as the hydrogen-storage alloy, since the optimum thickness of the packed bed of this alloy is about 2 cm as already described, the device of FIG. 3 used for the storage of 16 Nm$^3$ of hydrogen satisfies the following physical particulars.

| | |
|---|---|
| Weight of LaNi$_5$ | 103 kg |
| Specific gravity of LaNi$_5$ | 8.4 |
| Void ratio | 34.7% |
| Packing ratio of alloy | 75% |
| Thickness of packed bed of alloy | 2 cm |
| Number of packed bed of alloy | 16 |
| Thickness of porous plate | 1 cm |
| Number of porous plate | 8 |
| Thickness of heating/cooling member | 1.5 cm |
| Number of heating/cooling member | 9 |
| Thickness of device (2 cm × 16 + 1 cm × 8 + 1.5 cm × 9) | 53.5 cm |
| Space for fitting the device | 2.5 cm |

In view of these dimensions, a cylindrical container having an inner diameter of 79.2 cm may be used. The thickness of the cylindrical container is 10 cm, for example.

The device, therefore, has the following size: 79.2 cm (diameter)×10 cm (thickness).

The procedure for the operation of this device is entirely the same as that involved in the device illustrated in FIG. 1 and FIG. 2.

Also in the scaled up device of the construction illustrated in FIGS. 3-4, the optimum thickness of the packed bed of the hydrogen-storage alloy used in the device of FIG. 1 is retained. This enlarged device, therefore, similarly attains the aforementioned effect contemplated by this invention while permitting a desired increase to the capacity for the storage of hydrogen.

The devices for the storage of hydrogen illustrated in FIG. 1 and FIG. 3 and the conventional cylinder used for the storage of hydrogen are compared in terms of capacity for storage in Table 1 below.

TABLE 1

| Storage device | Volume (liters) | Pressure (atm) | Capacity for storage of hydrogen (Nm$^3$) |
| --- | --- | --- | --- |
| Conventional cylinder | 57 | 150 | 7 |
| Device of FIG. 1 | 3.5 | 9.7 max. | 1.6 |
| Device of FIG. 3 | 49.2 | 9.7 max. | 16 |

It is noted from the data that for the storage of a fixed volume of hydrogen, the device of this invention using LaNi$_5$ as the hydrogen-storage alloy requires only $\frac{1}{5}$ to $\frac{1}{4}$ of the volume required by the conventional cylinder and that the pressure required at the time of storage is markedly decreased. Thus, the device of this invention provides required storage of hydrogen with much higher efficiency.

FIG. 5 depicts a concept of the device constructed by having a still greater number of basic units of the construction of FIG. 1 arranged serially. In this device, hydrogen is fed through the feed pipe 4 and allowed to be occluded by the hydrogen-storage alloy placed in the individual compartments 10, 11. The heating (cooling) medium is fed through the inlet pipe 8. (For the simplicity of drawing, the sintered metal plates 1, 2 are represented by one line.)

Besides the parallel arrangement, the plurality of basic units used for the purpose of scaling up capacity may be arranged in serial connection. Optionally, groups each having a plurality of basic units arranged parallelly may be arranged in serial connection.

Another combination wherein a plurality of basic units are arranged one on top of another in a vertical direction enjoys the advantage of economizing the floor space required for the installation.

In any event, the characteristics of the basic unit of the device of this invention are retained intact even when the device is scaled up in capacity. That is to say, scaling up permits a desired increase of the capacity of the device for the storage of hydrogen without sacrificing the effect of the invention.

Now, this invention will be described below with reference to a working example.

EXAMPLE

In a device of the construction of FIG. 1, porous plates 1, 2 were separated from each other by 10 mm, the porous plates 1, 2 were separated respectively from heating/cooling members 5, 6 by a fixed distance of 20 mm, the heating/cooling members each had an inner volume of 408 cm$^3$ and a thickness of 15 mm, and the container as the outer shell of the device had a diameter of 22.8 cm. In this device 10.3 kg of LaNi$_5$ as the hydrogen-storage alloy was placed in the spaces 10, 11. The porous plates were sintered plates of stainless steel 2 mm in thickness.

Hydrogen of a pressure of 7 kg/cm$^2$ was introduced into the device at room temperature to be occluded by the alloy. Subsequently, the alloy was heated to 70° C. to release hydrogen. The alloy was fully activated by repeating the procedure. After the activation, a cooling medium was introduced through an inlet pipe 8 into the heating/cooling members 5, 6 to cool the alloy to 5° C. At the same time, hydrogen was introduced under a pressure of 7 kg/cm$^2$ into the porous plates. After 120 minutes of this supply of hydrogen, the alloy was converted into a hydride by occlusion of a total of 143 g (1.6 Nm$^3$) of hydrogen. Then, instead of the cooling medium, a heating medium was introduced through the inlet pipes 8 to heat the alloy to about 80° C. In 120 minutes, the hydride completely released the hydrogen.

What is claimed is:

1. A device for the storage of hydrogen, which comprises:
   a container,
   two porous plates opposed parallelly to each other across a fixed distance within the container and fastened to the inner wall of the container so as to divide the interior of the container,
   two heating/cooling members disposed one each outside the porous plates and separated from the corresponding porous plates by a fixed distance, and
   an alloy capable of storing hydrogen placed in the spaces intervening between the porous plates and the heating/cooling members.

2. The device according to claim 1, wherein the heating/cooling members are each provided with an inner space for retaining a heating/cooling medium and the inner spaces communicate with each other via a connecting pipe.

3. The device according to claim 1, wherein the space intervening between the two porous plates is provided in the container wall with a hydrogen discharge pipe.

4. A device for the storage of hydrogen, which comprises:
   a container,
   at least three heating/cooling members spaced regularly from each other and arranged parallelly to each other within the container so as to divide the interior of the container,
   two porous plates opposed parallelly to each other across a fixed distance within each of the spaces intervening between the adjacent heating/cooling members, and
   an alloy capable of storing hydrogen placed in the spaces intervening between the porous plates and the heating/cooling members.

5. The device according to claim 4, wherein the heating/cooling members are each provided with an inner space for retaining heating/cooling medium and the inner spaces communicate with each other via a connecting pipe.

6. The device according to claim 4, wherein the space intervening between the two porous plates is provided in the container wall with a hydrogen discharge pipe.

* * * * *